(12) United States Patent
Hayama

(10) Patent No.: US 10,648,389 B2
(45) Date of Patent: May 12, 2020

(54) EXHAUST DEVICE

(71) Applicant: HONDA MOTOR CO., LTD., Tokyo (JP)

(72) Inventor: Yoshitaka Hayama, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/910,516

(22) Filed: Mar. 2, 2018

(65) Prior Publication Data

US 2018/0274426 A1    Sep. 27, 2018

(30) Foreign Application Priority Data

Mar. 23, 2017  (JP) ................. 2017-057725

(51) Int. Cl.
| | |
|---|---|
| *F01N 3/28* | (2006.01) |
| *F01N 1/08* | (2006.01) |
| *F01N 3/10* | (2006.01) |
| *F01N 13/00* | (2010.01) |
| *F01N 13/18* | (2010.01) |
| *F02B 61/02* | (2006.01) |

(52) U.S. Cl.
CPC ......... *F01N 3/2875* (2013.01); *F01N 1/083* (2013.01); *F01N 1/084* (2013.01); *F01N 1/089* (2013.01); *F01N 3/101* (2013.01); *F01N 3/2853* (2013.01); *F01N 3/2885* (2013.01); *F01N 3/2892* (2013.01); *F01N 13/007* (2013.01); *F01N 13/18* (2013.01); *F01N 13/1888* (2013.01); *F01N 2330/02* (2013.01); *F01N 2470/16* (2013.01); *F01N 2590/04* (2013.01); *F02B 61/02* (2013.01); *Y02T 10/22* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,866,932 A | * | 9/1989 | Morita ............... | F01N 3/021 60/288 |
| 5,736,690 A | * | 4/1998 | Karlsson ............. | F01N 1/08 181/230 |
| 6,789,644 B2 | * | 9/2004 | Mukaida .............. | F01N 1/089 181/212 |
| 7,127,884 B2 | * | 10/2006 | Worner ............... | F01N 1/04 60/299 |

(Continued)

FOREIGN PATENT DOCUMENTS

| | | |
|---|---|---|
| EP | 3 267 004 A1 | 1/2018 |
| JP | 2009-091999 | 4/2009 |
| WO | 2016/140336 A1 | 9/2016 |

OTHER PUBLICATIONS

European Search Report dated Apr. 25, 2018, 9 pages.

*Primary Examiner* — Binh Q Tran
(74) *Attorney, Agent, or Firm* — Rankin, Hill & Clark LLP

(57) ABSTRACT

An exhaust device includes an expansion chamber that expands an exhaust gas from an engine; a separator that partitions the expansion chamber; and a plurality of catalyst units arranged in the expansion chamber and supported in parallel by the separator. The separator is divided into upper and lower portions through a dividing plane, and the plurality of catalyst units are supported in such a manner as to be clamped from upper and lower sides at the dividing plane.

6 Claims, 5 Drawing Sheets

(56) References Cited

U.S. PATENT DOCUMENTS

| | | | |
|---|---|---|---|
| 8,028,798 B2 * | 10/2011 | Koyanagi | F01N 1/003 181/212 |
| 8,136,350 B2 * | 3/2012 | Duch | F01N 1/083 181/262 |
| 9,010,096 B2 * | 4/2015 | Golin | F01N 3/021 60/299 |
| 2010/0192880 A1 | 8/2010 | Koyanagi et al. | |

* cited by examiner

EXHAUST DEVICE

TECHNICAL FIELD

The present invention relates to an exhaust device.

BACKGROUND ART

Hitherto, as an exhaust device, there has been known one that is provided with an expansion chamber that expands an exhaust gas from an engine, partition wall members (72, 74) for partitioning the expansion chamber, and a plurality of catalysts (90) disposed in the expansion chamber and supported in parallel by the partition wall members (72, 74), as seen in Patent Document 1, for example.

Two communication pipes (82, 84) are welded to the partition wall members (72, 74), and the catalysts (90) for purifying the exhaust gas flowing through the pipes are arranged inside these communication pipes (82, 84).

CITATION LIST

Patent Document

Patent Document 1: JP 2009-091999 A

SUMMARY OF THE INVENTION

Problem to be Solved by the Invention

However, in the conventional exhaust device mentioned above, the two communication pipes (82, 84) need to be welded to the partition wall members (72, 74), and, therefore, it has not been easy to dispose the catalysts in the expansion chamber.

A problem to be solved by the present invention is to provide an exhaust device in which a catalyst can be easily disposed in an expansion chamber.

Means for Solving Problem

In order to solve the above problem, according to the present invention, there is provided an exhaust device including an expansion chamber in which to expand an exhaust gas from an engine, a separator that partitions the expansion chamber, and a plurality of catalyst units arranged in the expansion chamber and supported in parallel by the separator. The separator is divided into upper and lower portions through a dividing plane, and the plurality of catalyst units are supported in the manner of being clamped from upper and lower sides at the dividing plane.

The exhaust device thus configured as above allows the catalysts to be disposed in the expansion chamber by supporting the catalyst units in such a manner as to be clamped from upper and lower sides by the separator divided into upper and lower portions through the dividing plane. This enables an easy disposition of the catalysts in the expansion chamber.

In this exhaust device, a configuration may be taken in which the plurality of catalyst units are arranged in such a manner that the spacing therebetween is narrowed along a direction from an upstream side toward a downstream side of exhaust.

The configuration as above allows the spacing between the catalyst units in the expansion chamber to be reduced and the width of the expansion chamber to be narrowed, while securing the spacing between the catalyst units on the upstream exhaust side of.

In this exhaust device, a configuration may be taken in which the separator is bent in such a manner as to form a surface orthogonal to a flow direction of the exhaust gas passing through the catalyst units, and the plurality of catalyst units are supported from upper and lower sides by upper and lower recessed portions provided on both sides of the bent portion.

The configuration as above allows favorable support of the plurality of catalyst units arranged in such a manner that the spacing therebetween is narrowed along the direction from the upstream side toward the downstream exhaust side of inside the expansion chamber.

In this exhaust device, a configuration may be taken in which between the upper and lower recessed portions of the separator and the catalyst units, buffer materials are provided at portions located in the first and third quadrants or in the second and fourth quadrants when viewed from the flow direction of the exhaust gas passing through the catalyst units.

The configuration as above allows vertical and left-right vibrations of the catalyst units to be buffered with a reduced amount of buffer material.

In this exhaust device, a configuration may be taken in which the separator is provided with a communication port that communicates between expansion chambers partitioned by the separator, and the communication port is provided with a burring portion oriented toward the downstream exhaust side.

The configuration as above allows, a smooth flow of the exhaust gas passing through the communication port.

In this exhaust device, a configuration may be taken in which a case forming the expansion chamber is divided into upper and lower portions, and the upper and lower cases thus formed support one-side ends of the catalyst units with the one-side ends clamped therebetween.

The configuration as above allows the catalyst units to be supported in an easy and stable state, and, thereby enhancing assembly efficiency.

In this exhaust device, a configuration may be taken in which the catalyst units have one-side ends and other-side ends, the one-side ends of which are fixed to a case forming the expansion chamber, and the other-side ends of which are supported by the separator in such a manner as to be clamped from upper and lower sides.

The configuration as above allows firm and easy fixation of the catalyst units to the case.

MODE FOR CARRYING OUT THE INVENTION

Figure 1:
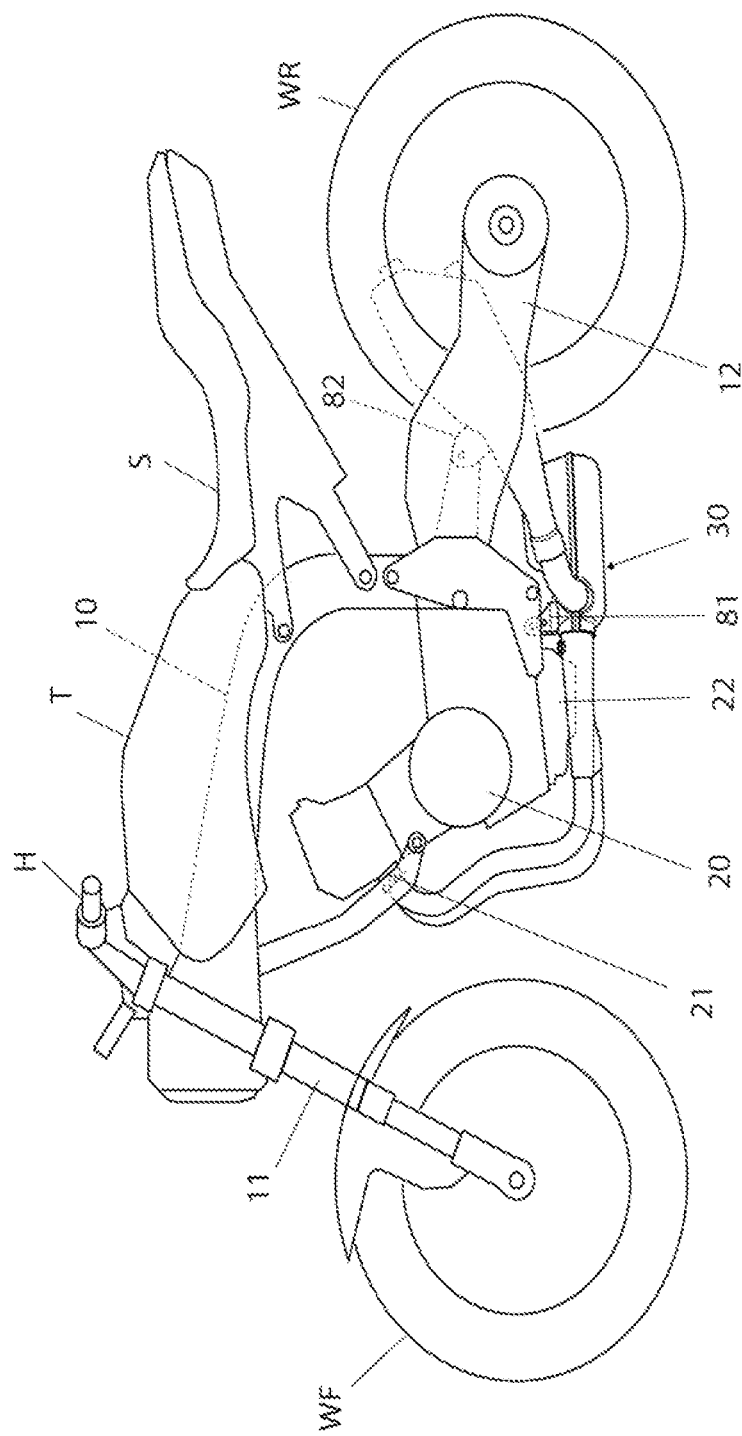
FIG. 1 is a side view depicting an example of a motorcycle using an embodiment of an exhaust device according to the present invention.

An embodiment of an exhaust device according to the present invention will be described below, referring to the drawings. Note that the drawings are viewed along the orientation of the reference numerals. In the following description, the front and rear sides, the left and right sides, and the upper and lower sides are defined along the directions when viewed from the driver. If necessary, the front side of the vehicle is indicated by Fr, the rear side by Rr, the left side by L, the right side by R, the upper side by U, and the lower side is indicated by D, in the drawings. In the drawings, the same or corresponding parts are denoted by the same reference numerals.

FIG. 1 is a side view of a motorcycle to which an embodiment of the exhaust device according to the present invention is applied.

In a motorcycle 1, a front wheel WF is supported on a front portion of a vehicle body frame 10 through a front fork 11, and a rear wheel WR is supported on a rear portion of the vehicle body frame 10 through a swing arm 12. An engine 20 is mounted on the vehicle body frame 10, and the rear wheel WR is driven by the engine 20. H denotes a handle for steering the front wheel WF, T denotes a fuel tank, and S denotes a seat on which the driver is seated.

An exhaust device 30 is connected to an exhaust outlet 21 of the engine 20.

Figure 2:
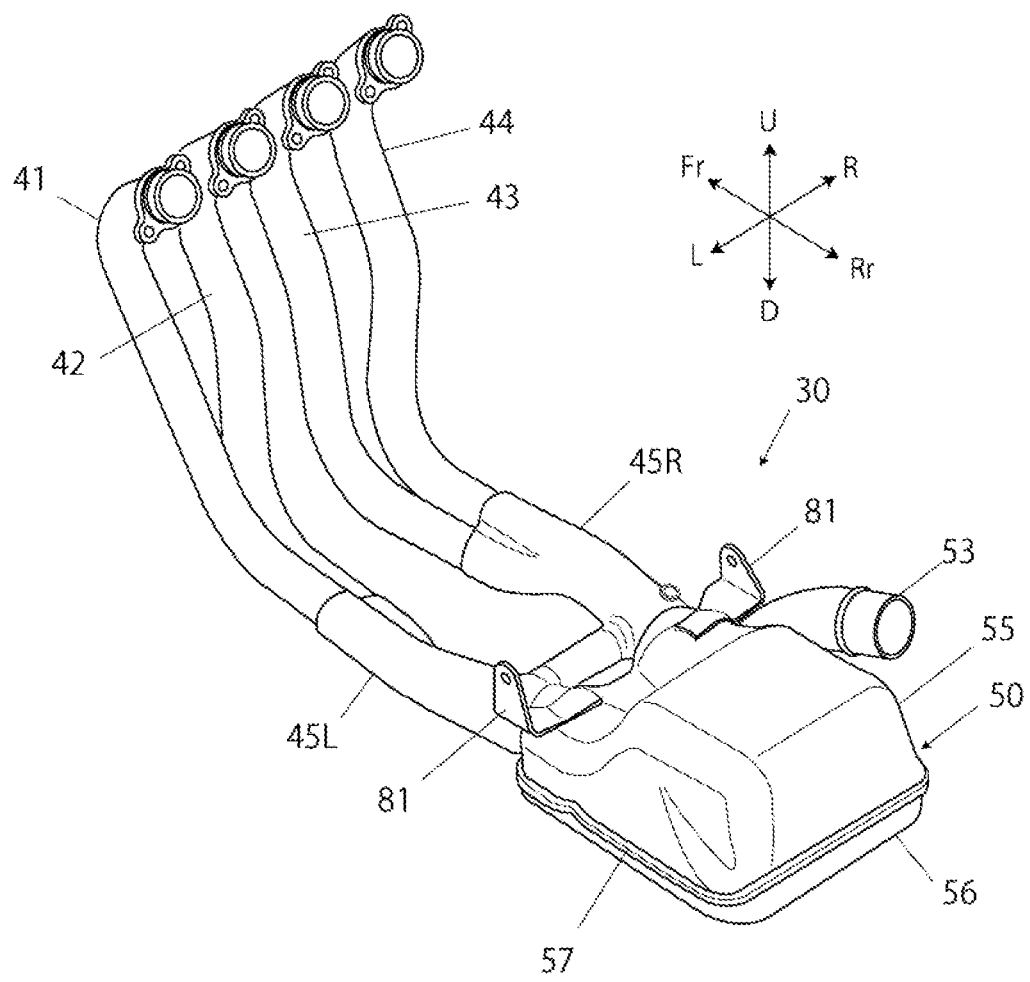
FIG. 2 is a perspective view of the embodiment.
Figure 3:
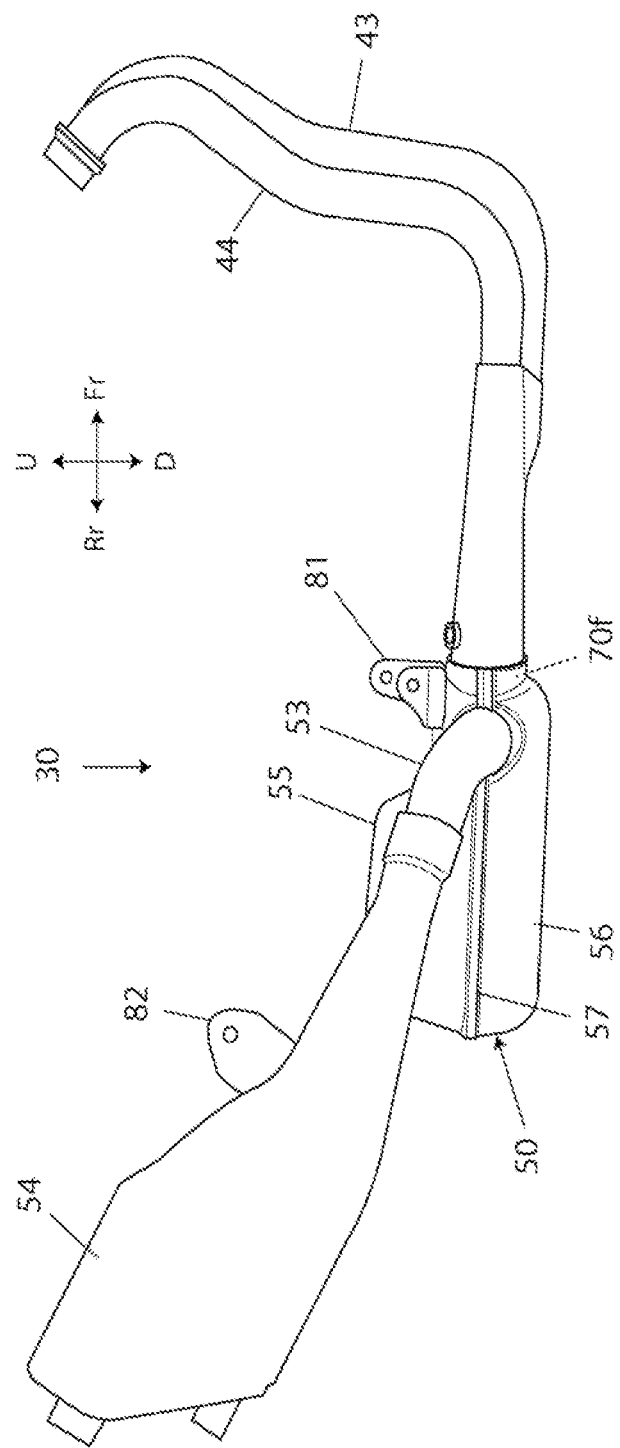
FIG. 3 is a right side view of the embodiment.
Figure 4:
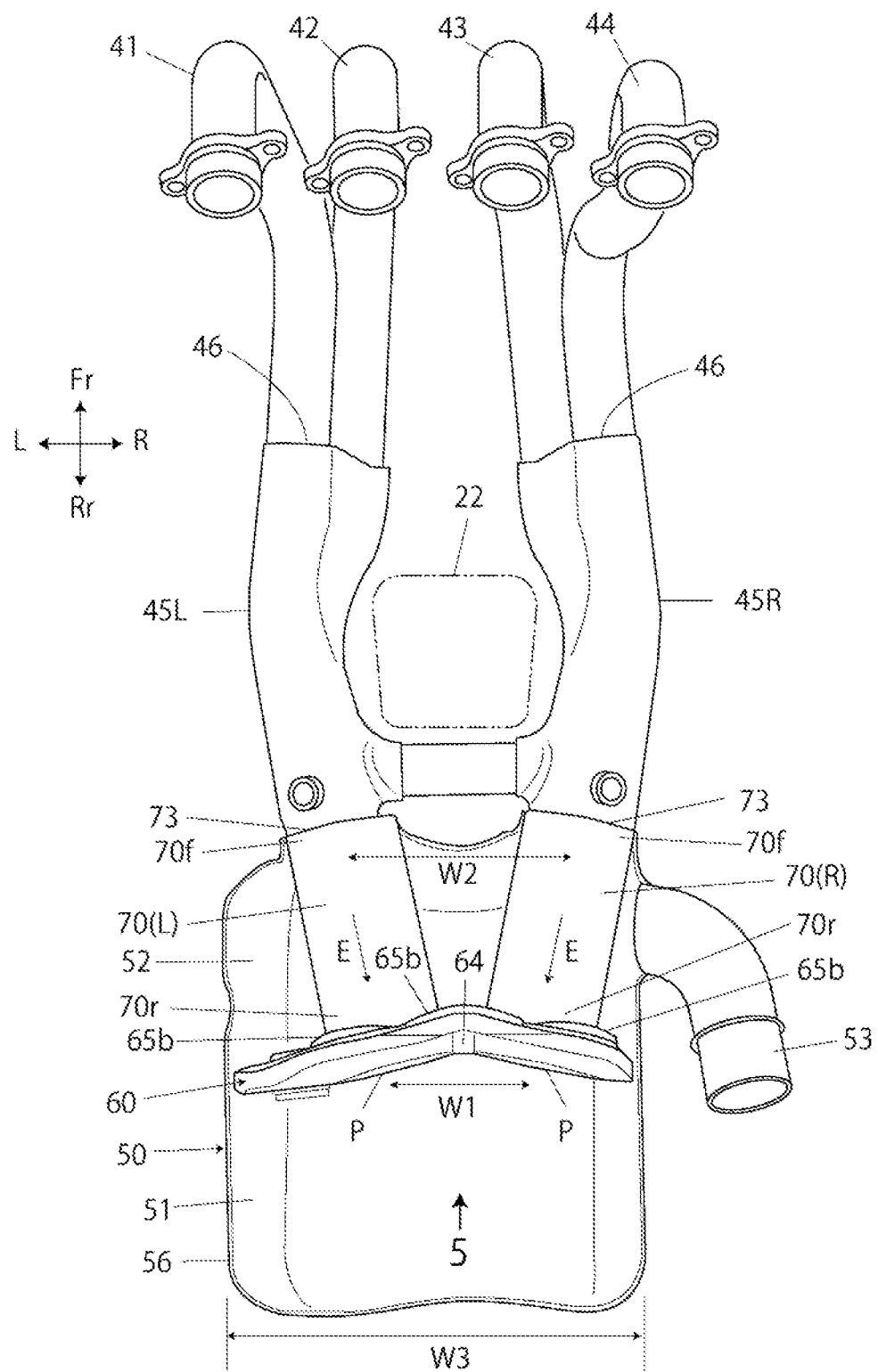
FIG. 4 is a partially omitted plan view of the embodiment, in which an upper case of an expansion chamber is omitted.

As shown in FIGS. 2 to 4, mainly in FIG. 4, the exhaust device 30 in the present embodiment includes an expansion chamber 50 that expands an exhaust gas from the engine 20, a separator 60 that partitions the expansion chamber 50, and a plurality of catalyst units 70 arranged in the expansion chamber 50 and supported in parallel by the separator 60.

Figure 5:
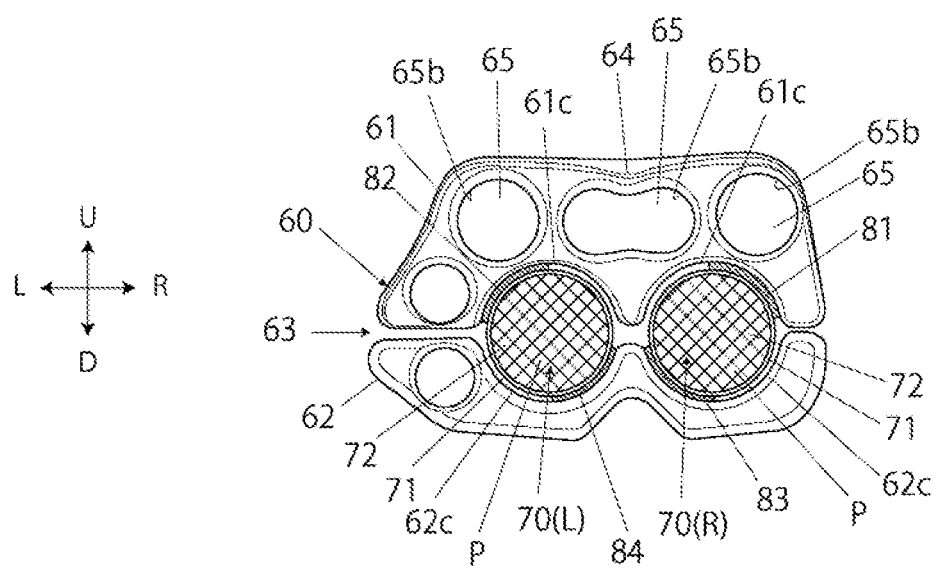
FIG. 5 is a figure depicting a separator 60 and catalyst units 70, when viewed from the direction of arrow 5 in FIG. 4.

Besides, as shown in FIG. 5, the separator 60 is divided into upper and lower portions through a dividing plane 63, and the plurality of catalyst units 70 are supported in such a manner as to be clamped from the upper and lower side at the dividing plane 63. The separators on the upper and lower sides which are divided at the dividing plane 63 are denoted by reference numerals 61 and 62. In addition, they will hereinafter be referred to as an upper separator 61 and a lower separator 62, as required.

According to the exhaust device 30, supporting the catalyst units 70 in such a manner as to be clamped from the upper and lower sides by the separators 60 (namely, the upper and lower separators 61 and 62) divided into upper and lower portions through the dividing plane 63, allows the catalyst to be disposed in the expansion chamber 50, thereby enabling an easy disposition of the catalyst in the expansion chamber 50.

As shown in FIG. 4, the plurality (two in FIG. 4) of catalyst units 70 are arranged in such a manner that the spacing therebetween is narrowed along the direction from the upstream side toward the downstream exhaust side (side indicated by arrow E).

The configuration as above allows a spacing W1 between the catalyst units 70 in the expansion chamber 50 to be reduced and a width W3 of the expansion chamber 50 to be narrowed, while securing a spacing W2 between the catalyst units 70 on the upstream exhaust side.

As shown in FIG. 5, the catalyst unit 70 in the present embodiment includes a metallic hollow cylindrical case 71, and a catalyst 72 stored in the hollow cylindrical case 71, and purifies the exhaust gas flowing through the inside of the catalyst unit 70.

As shown in FIGS. 1 to 4, the exhaust device 30 has exhaust pipes 41 to 44 connected individually to exhaust outlets 21 of the engine 20, and the exhaust gas from the engine 20 is introduced into the expansion chamber 50 by these exhaust pipes 41 to 44.

As shown in FIG. 4, the exhaust pipes 41 and 42 arranged on the left side of the vehicle body are connected to and join a confluence pipe 45L by welding. The exhaust pipes 43 and 44 arranged on the right side of the vehicle body are connected to and join a confluence pipe 45R by welding. Welded parts are individually denoted by reference numeral 46.

The catalyst units 70(L, R) are individually connected to the downstream side of the confluence pipes 45(L, R) by welding. Welded parts are denoted by reference numeral 73.

As shown in FIG. 1, an oil pan 22 (see phantom line in FIG. 4) is provided at a bottom portion of the engine 20.

For example, in order to make the minimum ground clearance higher in such a motorcycle, it may be contemplated to install the exhaust pipes on lateral sides of the oil pan 22.

Taking such a configuration and providing the catalyst and the expansion chamber on the downstream side of the exhaust pipes causes, the increased width of the expansion chamber.

In view of this, in the present embodiment, as shown in FIG. 4, the confluence pipes 45(L, R) located on lateral sides of the oil pan 22 are bent to the left and right in such a manner as to bypass the oil pan 22. In addition, the catalyst units 70(L, R) connected to the downstream side of the confluence pipes 45(L, R) are arranged in such a manner that the spacing therebetween is narrowed from the upstream side toward the downstream exhaust side (side indicated by arrow E).

The configuration as above allows the spacing W1 between the catalyst units 70 in the expansion chamber 50 to be reduced and the width W3 of the expansion chamber 50 to be narrowed, while securing the spacing W2 between the catalyst units 70 on the upstream exhaust side of. Simultaneously, the configuration allows the minimum ground clearance of the vehicle body to be made higher.

As shown in FIGS. 4 and 5, the separator 60 has a configuration in which the separator 60 is bent in such a manner as to form surfaces P orthogonal to the flow directions E (axial direction of the catalyst units 70) of the exhaust gas passing through the catalyst units 70, and the catalyst units 70 are individually supported from the upper and lower sides by upper and lower recessed portions 61c and 62c provided on both sides of the bent portion 64.

The configuration as above allows the favorable support of the plurality of catalyst units 70 arranged in such a manner that the spacing therebetween is narrowed from the upstream side toward the downstream side of exhaust inside the expansion chamber 50, and facilitates taking measures against thermal expansion of the catalyst units 70. In other words, the catalyst units 70 are likely to be contractible and expandable in the axis directions (directions indicated by arrow E) of the catalyst units 70 with respect to the separator 60.

As shown in FIG. 5, between the upper and lower recessed portions 61c and 62c of the separator 60 and the catalyst units 70, buffer materials 81 to 84 are provided at positions located in the first and third quadrants, or in the second and fourth quadrants, when viewed from the flow direction (direction indicated by arrow E) of the exhaust gas passing through the catalyst units 70.

The configuration as above allows vertical and left-right vibrations of the catalyst units 70 to be buffered with a reduced amount of buffer materials. In other words, the arrangement allows the vertical and left-right vibrations of the catalyst units 70 to be buffered with a small amount of buffer material, as compared to the case where end portions of the catalyst units 70 are supported by hollow cylindrical (ring-shaped) buffer materials.

In the embodiment shown in FIG. 5, the catalyst unit 70(R) on the right side is supported by the buffer materials 81 and 83 disposed in the first and third quadrants, whereas the catalyst unit 70(L) on the left side is supported by the buffer materials 82 and 84 disposed in the second and fourth quadrants. Alternatively, this layout may be reversed. Namely, the catalyst unit 70(R) on the right side may be supported in the second and fourth quadrants, whereas the catalyst unit 70(L) on the left side may be supported in the first and third quadrants.

In either case, the left and right catalyst units 70 are supported by the buffer materials in left-right symmetry. Therefore, a well-balanced buffering action can be obtained.

In addition, in the present embodiment, the buffer materials are formed into arcuate when viewed from the flow direction of the exhaust gas passing through the catalyst units 70. Accordingly, a well-balanced buffering action can be obtained.

As shown in FIGS. 4 and 5, the separator 60 is provided with communication ports 65 (FIG. 5) that communicates between the expansion chambers partitioned by the separator 60, namely, first and second expansion chambers 51 and 52 in the present embodiment. The communication ports 65 are each provided with a burring portion 65b oriented toward the downstream exhaust side (see FIG. 4).

The configuration as above allows, a smooth flow of the exhaust gas passing through the communication ports 65.

The plural communication ports 65 are provided, and they are each provided with the burring portion 65b.

The exhaust gas coming from the exhaust outlets 21 of the engine 20 is introduced through the exhaust pipes 41 to 44, the confluence pipes 45(L, R), and the catalyst units 70(L, R) into the first expansion chamber 51, where the exhaust gas undergoes primary expansion. Then, the exhaust gas flows through the communication ports 65 into the second expansion chamber 52, where the exhaust gas undergoes secondary expansion.

The second expansion chamber 52 is provided with an exhaust discharge pipe 53, and a muffler 54 (see FIG. 3) is connected to the downstream side of the exhaust discharge pipe 53.

Therefore, the exhaust gas flowing into the second expansion chamber 52 is discharged into the atmosphere through the exhaust discharge pipe 53 and the muffler 54.

As shown in FIGS. 3 and 4, the case forming the expansion chamber 50 is divided into upper and lower portions, and the upper and lower cases 55 and 56 thus formed support one-side ends 70f of the catalyst units 70 with the one-side ends 70f clamped therebetween.

The configuration as above allows, the catalyst units 70 to be supported in an easy and stable state, thereby enhancing assembly efficiency.

A joined portion 57 (FIG. 3) of the upper and lower cases 55 and 56 is joined by welding.

The upper and lower cases 55 and 56 and the separator 60 can also be fixed by spot welding from the outside of the cases.

In the present embodiment, the catalyst units 70 have the one-side ends 70f and others-side ends 70r, the one-side ends 70f of which are fixed to the cases 55 and 56 forming the expansion chamber 50, and the other-side ends 70r of which are supported in such a manner as to be clamped by the separator 60 from the upper and lower sides.

The configuration as above allows firm and easy fixation of, the catalyst units 70 to the cases.

The upper and lower cases 55 and 56 and the one-side ends 70f of the catalyst units 70 may also be fixed by welding. In the present embodiment, the upper and lower cases 55 and 56 and the one-side ends 70f of the catalyst units 70 are fixed by welding.

In FIG. 3, reference numerals 81 and 82 denote mounting portions for for the vehicle body frame 10.

While the embodiment of the present invention has been described above, the present invention is not necessarily limited to the above embodiment, and modifications may be appropriately made within the scope of the present invention.

For example, while the description has made to the case where the catalyst units 70 are two in the embodiment, the present invention is also applicable to cases where catalyst units are three or more.

EXPLANATIONS OF LETTERS OR NUMERALS

20: Engine, 50: Expansion chamber, 55, 56: Upper and lower cases, 60: Separator, 61c, 62c: Recessed portion, 63: Dividing plane, 64: Bent portion, 65: Communication port, 65b: Burring portion, 70: Catalyst unit, 70f: One-side end, 81 to 84: Buffer material.

The invention claimed is:

1. An exhaust device comprising:
   an expansion chamber that expands an exhaust gas from an engine;
   a separator that partitions the expansion chamber; and
   a plurality of catalyst units arranged-in the expansion chamber and supported in parallel by the separator,
   wherein the separator is divided into upper and lower portions through a dividing plane, and the plurality of catalyst units are supported so as to be clamped from upper and lower sides at the dividing plane, and
   wherein the plurality of catalyst units are arranged such that the spacing therebetween is narrowed along a direction from an upstream side toward a downstream exhaust side.

2. The exhaust device according to claim 1,
   wherein the separator is bent so as to form a surface that is orthogonal to a flow direction of the exhaust gas passing through the plurality of catalyst units, and the plurality of catalyst units are supported from upper and lower sides by upper and lower recessed portions provided on both sides of the bent portion.

3. The exhaust device according to claim 2,
   wherein between the upper and lower recessed portions of the separator and the catalyst units, buffer materials are provided at portions located in the first and third quadrants or in the second and fourth quadrants when viewed from the flow direction of the exhaust gas passing through the catalyst units.

4. The exhaust device according to claim 1,
   wherein the separator is provided with a communication port that communicates between expansion chambers partitioned by the separator, and the communication port is provided with a burring portion oriented toward the downstream side of exhaust.

5. The exhaust device according to claim 1,
   wherein a case forming the expansion chamber is divided into upper and lower portions, and the upper and lower cases thus formed support one-side ends of the catalyst units with the one-side ends clamped therebetween.

6. The exhaust device according to claim 1,
   wherein the catalyst units have one-side ends and other-side ends, the one-side ends of which are fixed to a case forming the expansion chamber, and the other-side ends of which are supported by the separator so in such a manner as to be clamped from upper and lower sides.

\* \* \* \* \*